(No Model.)
H. RANDOL.
PROVISION SAFE.
No. 381,721. Patented Apr. 24, 1888.
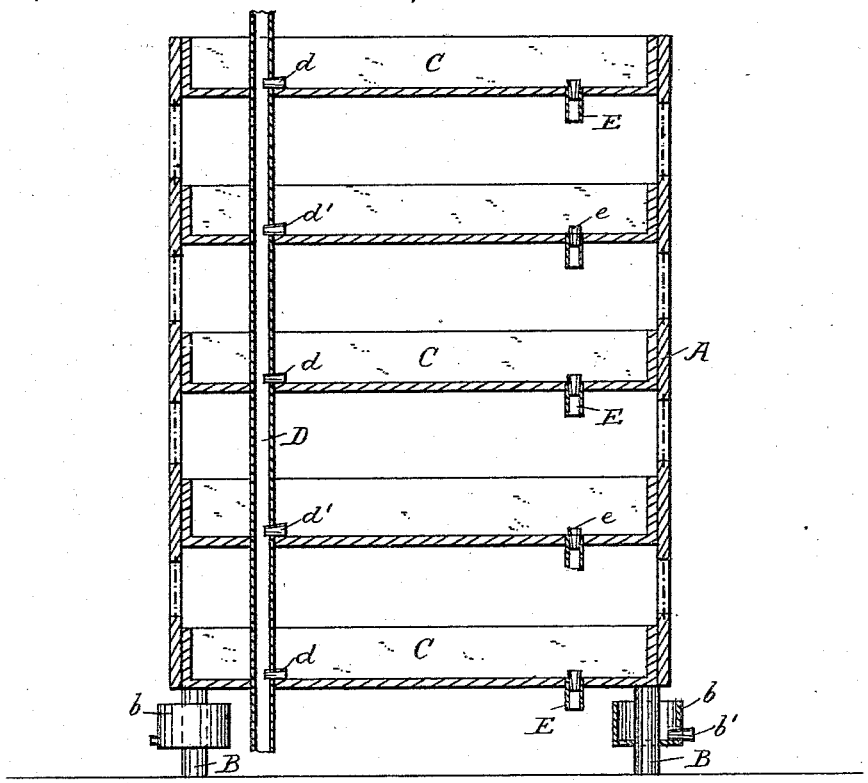
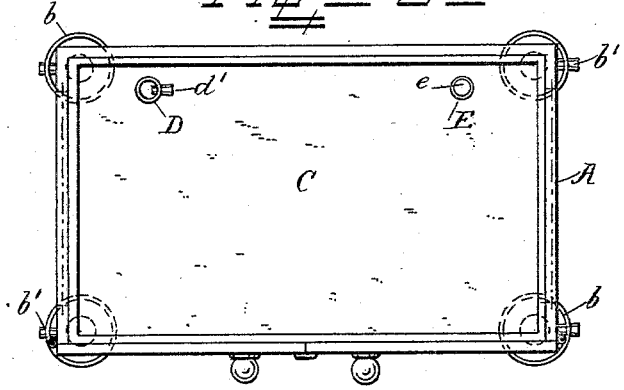
Witnesses.
W. D. Porter
J. R. Morris
Inventor,
Harriet Randol.
By her Attorney
Herbert W. T. Jenner

UNITED STATES PATENT OFFICE.

HARRIET RANDOL, OF POTTERSBURG, KANSAS.

PROVISION-SAFE.

SPECIFICATION forming part of Letters Patent No. 381,721, dated April 24, 1888.

Application filed September 2, 1887. Serial No. 248,574. (No model.)

*To all whom it may concern:*

Be it known that I, HARRIET RANDOL, a citizen of the United States, residing at Pottersburg, in the county of Lincoln and State of Kansas, have invented certain new and useful Improvements in Provision-Safes; and I do hereby declare the following to be a full, clear, and exact description of the invention, such as will enable others skilled in the art to which it appertains to make and use the same.

This invention relates to provision-safes; and it consists in the novel construction and combination of parts hereinafter fully described and claimed, whereby the shelves are kept flooded with water and all insects are excluded.

In the drawings, Figure 1 is a vertical transverse section through the safe, and Fig. 2 is a plan view of the same.

A is the inclosing-case of the safe, which is formed of wood or any other suitable material. It is framed together and provided with doors and catches for holding them in the usual manner. Panels of wire-gauze or other perforated material are inserted in the doors or sides, so that the contents of the safe are freely ventilated.

To prevent vermin from crawling up into the safe, the legs B are provided at the bottom, and $b$ are cups for water, which are secured about the legs and provided with the plugs $b'$ at the bottom, so that the water can be let out when it becomes stale. The top and shelves are made in the form of trays C. These trays are water-tight, and for that purpose are preferably lined with zinc; but any other means for making them water-tight may be used.

D is a pipe which extends vertically through the whole series of trays, and is provided with a lateral hole, $d$, close to the bottom of each tray. A removable plug, $d'$, is placed in each hole, so that the water can be let into or out of each tray, as desired.

E are short pipes which depend from the bottom of each tray, and are provided with the removable plugs $e$, so that the water can be let out of one tray into the next beneath it. When all the plugs $e$ are removed, a constant stream of water can be caused to pass through the trays, the holes $d$ being closed by the plugs.

This safe is intended for both kitchen and dairy use and will keep anything placed in it very cool, and will prevent insects and other vermin from getting to it.

What I claim is—

1. In a provision-safe, the combination of an inclosing-case, water-tight trays supported within the case, and a pipe extending through all the trays and provided with plugs for letting the water out of each tray when desired.

2. In a provision-safe, the combination of an inclosing-case, water-tight trays supported within the case, short pipes provided with plugs for letting the water out of one tray into the next beneath it, and a long vertical pipe extending through all the trays and provided with lateral holes and plugs for draining each tray separately.

In testimony whereof I affix my signature in presence of two witnesses.

HARRIET RANDOL.

Witnesses:
N. R. WATERMAN,
R. H. McCANDLESS.